S. O. WHITE.
CLUTCH.
APPLICATION FILED DEC. 14, 1914.
1,197,245.
Patented Sept. 5, 1916.
2 SHEETS—SHEET 2.
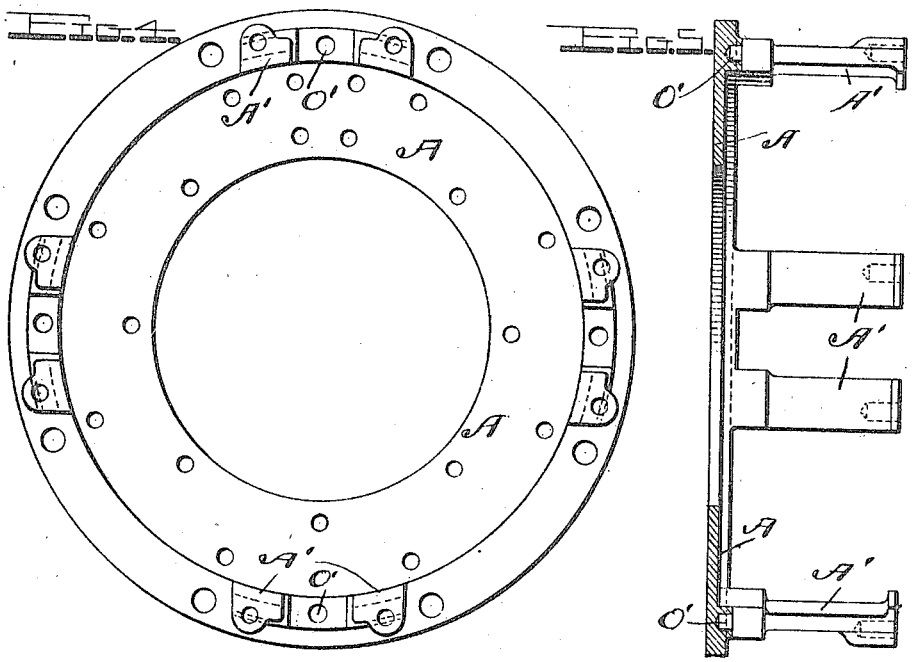
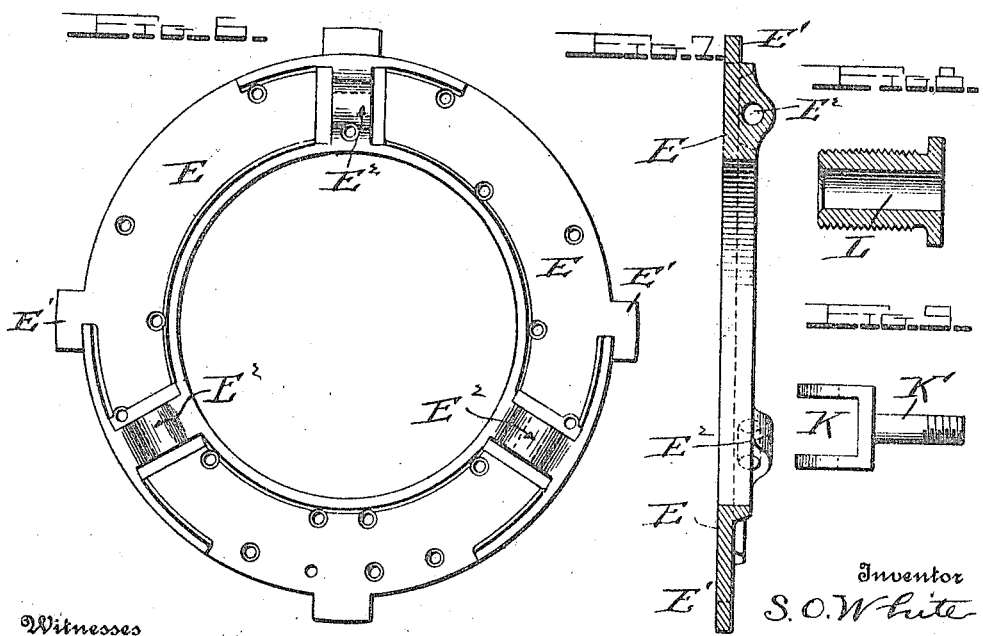

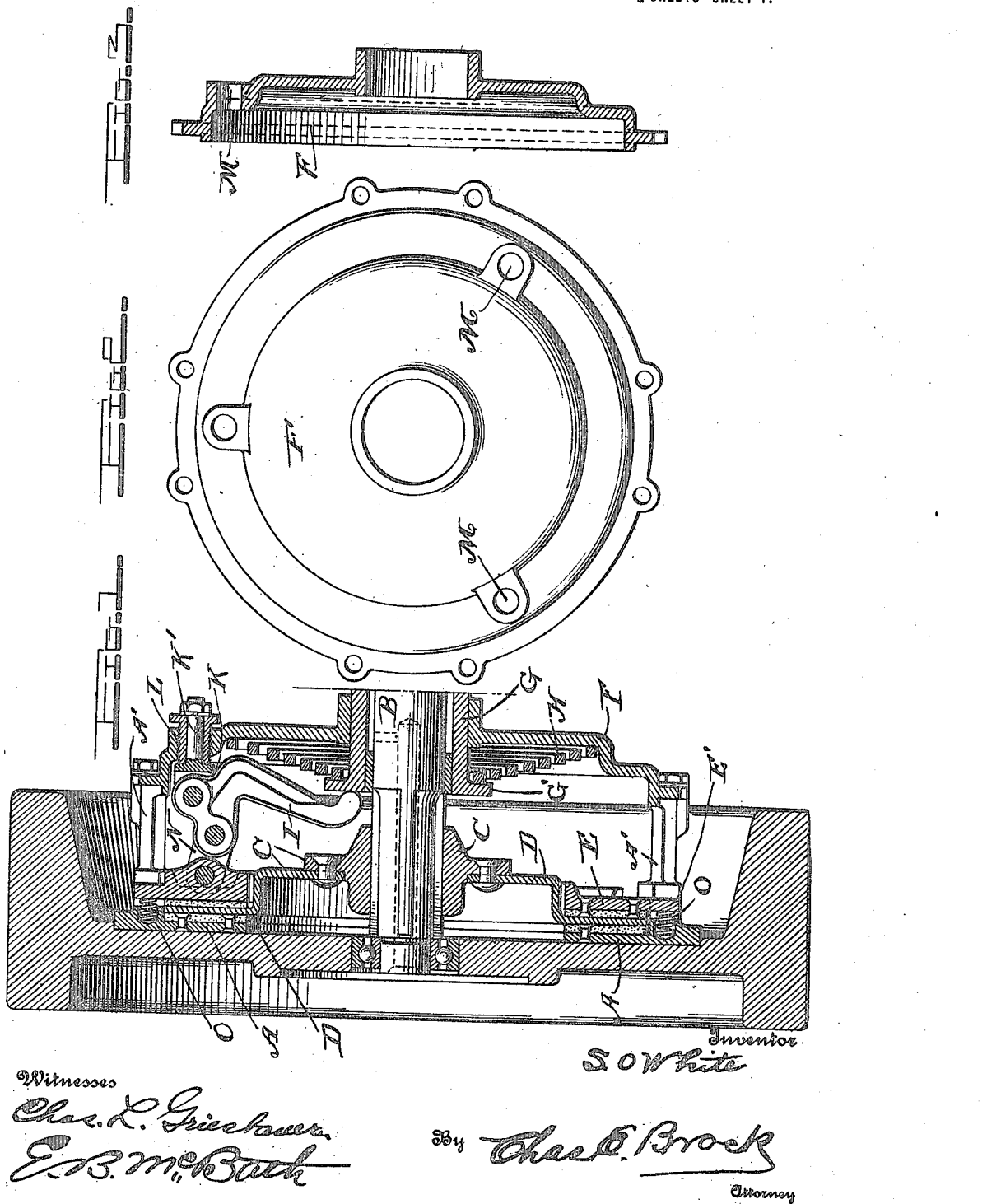

UNITED STATES PATENT OFFICE.

SAMUEL ORR WHITE, OF MUNCIE, INDIANA, ASSIGNOR TO THE WARNER GEAR COMPANY, OF MUNCIE, INDIANA, A CORPORATION OF INDIANA.

CLUTCH.

1,197,245.  Specification of Letters Patent.  Patented Sept. 5, 1916.

Application filed December 14, 1914. Serial No. 877,205.

*To all whom it may concern:*

Be it known that I, SAMUEL ORR WHITE, a citizen of the United States, residing at Muncie, in the county of Delaware and State of Indiana, have invented certain new and useful Improvements in Clutches, of which the following is a specification.

The invention relates generally to clutches, and is particularly adapted for use in connection with automobiles for transmitting motion from the engine to the transmission.

The object of the invention is to provide an exceedingly simple combination of elements for the purpose of providing a highly efficient clutch which can be quickly and easily operated to throw the same in or out as desired.

Another object of the invention is to provide for certain adjustments whereby any irregularity or inaccuracy of machine work can be quickly and easily compensated for, and likewise any wear of the parts, incidental to use.

Another object of the invention is to provide a clutch which can be easily released or opened and which is so constructed as to prevent rattling while the parts are in a released or open position.

With these various objects in view my invention consists in the novel features of construction, combination or arrangement, all of which will be fully described hereinafter and pointed out in the claim.

In the drawings forming a part of this specification Figure 1 is a sectional view of a clutch constructed in accordance with my invention. Fig. 2 is a face view of the spring plate. Fig. 3 is a sectional view of the same. Fig. 4 is a face view of the driving member. Fig. 5 is a sectional elevation of the same. Fig. 6 is a face view of the pressure plate or ring. Fig. 7 is a sectional view of the same. Fig. 8 is a sectional view of the clevis carrying sleeve and, Fig. 9 is a view of the clevis.

In carrying out my invention I employ a driving member A, which is bolted to the web of the motor flywheel and to the face of this member is riveted or otherwise secured a thin sheet of asbestos or other fabric or composition, suitable for making a good frictional contact. Shaft B, leading to the transmission is in axial alinement with the engine shaft and has a hub C, keyed or splined thereon so as to rotate with said shaft. Attached to this hub is the driven disk D, which is angled so as to present the outer portions thereof adjacent the friction surface of the driving member inasmuch as the driven disk is clamped or clutched between the friction surface on the driving member and the similar friction surface of a pressure ring or plate E. The pressure plate E, is circular in form and is provided with four equidistant lugs E′, which are adapted to rest between the rearwardly extending arms A′, which extend rearwardly from the member A, a spring plate F being secured to the rear ends of these arms A′, as most clearly shown in Fig. 1.

Working through the center of the spring plate F, is a sleeve G which is operated by any suitable lever mechanism (not shown). This sleeve G, is formed at its inner end with a collar G′, and a convolute spring H, is confined between this collar and the spring plate; the forward or central portion of the spring bearing against the collar, while the rear or outer portion thereof bears against the plate F; said plate being shaped to receive the same as most clearly shown. The tendency of this spring H, is to hold the collared end of sleeve G, in contact with the lower end of a lever I, said lever being pivoted in a clevis K, which clevis has its shank K′, secured in a sleeve L, this sleeve being threaded externally and adapted to be secured in the threaded aperture M, produced in the spring plate F, there being three such openings, and it will of course be understood that there are also three sleeves, three clevises and three levers arranged at equidistant points as most clearly shown in Figs. 2 and 6.

Each lever I, has a pair of links N, connected thereto, the opposite ends of said pair of links being astride the ears or bosses $E^2$, formed upon the rear face of the pressure plate E, at the proper points, and the relative pivotal points of the levers, and links, are such that when the sleeve G, is pushed inwardly or forwardly, the levers and links act as toggles to force the pressure plate into contact with the driven disk D and bind the same between the driving member A, and pressure plate E. When the sleeve G is moved in a rearward direction against the spring H the toggle of the levers and links is broken and the pressure plate is caused to move rearwardly preferably by means of coiled springs O, which are located in recesses O', produced in the driving member A, operating upon the extensions E', of the pressure plate; and these springs O, not only serve to throw the clutch open the moment the sleeve G is released, but they also serve to maintain the various parts in their proper positions and prevent rattling.

The clevises which carry the levers are each readily adjustable through the medium of the sleeve L, in which the clevises are fastened, it being necessary only, to partially unscrew the nut upon the end of the clevis shank and then turn the sleeve L, the desired amount in the proper direction; and by this construction, the clevis, and consequently the lever and links can be adjusted with considerable accuracy and thereby accommodate any small irregularity or inaccuracy in the machine work of the various friction engaging parts.

The levers I are knee-shaped, their outer end portions being at an angle to the shafts and their inner ends being curved toward the sleeve G, which they loosely engage. By reason of this formation the pivotal points of said levers are on lines oblique to the shafts, and the levers are so counterbalanced, by reason of this shape and the manner of mounting that centrifugal force is overcome, and it has been found that even when the motor was run at very high speed there is no tendency whatever for the clutch plates to hang or bind together. This result I have not been able to obtain with levers of other shape or manner of mounting. As above stated the inner end of each lever curves toward the sleeve G while at their outer ends each lever is pivotally connected to the pressure plate and the spring plate, to the first plate by the links N and to the plate F by the clevis K and sleeve L.

It will thus be seen that I provide an exceedingly simple and highly efficient form of clutch capable of carrying out all of the objects hereinbefore referred to.

What I claim is:

The combination with a clutch comprising a shaft, a driven member, a plate carried thereby, a pressure plate, and a forwardly spring pressed sleeve, of knee-shaped levers, means for pivotally connecting the outer ends of said levers to said plates, respectively, said pivotal points being on an oblique line with respect to said shaft, and having their inner ends curving rearwardly and in loose engagement with said sleeve.

SAMUEL ORR WHITE

Witnesses:
 RAY P. JOHNSON,
 M. M. EDGAR.